United States Patent [19]

Coppolani et al.

[11] Patent Number: 4,567,941
[45] Date of Patent: Feb. 4, 1986

[54] DEVICE FOR PROCESSING A FLOW SOLID PRODUCTS BY MEANS OF A FLOW OF LIQUID, MORE PARTICULARLY FOR COOLING VEGETABLES

[75] Inventors: Joseph Coppolani, Meudon la Foret; André Plantier, Reuil Malmaison, both of France

[73] Assignee: Societe Franco Europeenne de Materiel pour l'Industrie Alimentaire, "F.E.M.I.A.", France

[21] Appl. No.: 573,330

[22] Filed: Jan. 24, 1984

[30] Foreign Application Priority Data

Jan. 31, 1983 [FR] France ................................ 83 01470

[51] Int. Cl.⁴ ............................................. F28B 3/00
[52] U.S. Cl. ...................................... 165/111; 165/88; 422/272
[58] Field of Search ..................... 165/111, 88; 134/60, 134/65, 69, 169; 422/270, 271, 272

[56] References Cited

U.S. PATENT DOCUMENTS

| | | | |
|---|---|---|---|
| 3,930,801 | 1/1976 | Pinet | 422/270 |
| 4,230,675 | 10/1980 | Yarbro | 422/272 |
| 4,248,835 | 2/1981 | Genie | 422/272 |
| 4,289,734 | 9/1981 | Longuet | 165/111 X |

FOREIGN PATENT DOCUMENTS

| | | | |
|---|---|---|---|
| 0065791 | 12/1982 | European Pat. Off. | 165/111 |
| 1575644 | 6/1969 | France | 165/111 |
| 2092559 | 1/1972 | France | 165/111 |
| 2119571 | 8/1972 | France | 165/111 |
| 2480623 | 10/1981 | France | 165/111 |
| 1146017 | 3/1969 | United Kingdom . | |

Primary Examiner—Albert W. Davis, Jr.
Assistant Examiner—Peggy A. Neils
Attorney, Agent, or Firm—Steinberg & Raskin

[57] ABSTRACT

The present invention relates to a device for processing a flow of solid products with a counter-current flow of liquid to achieve for example a heat exchange comprising a drum rotating about its longitudinal axis, an endless screw or helix arranged within the drum and solid in rotation therewith, and defining sections, in each section is arranged a vane element which is secured to the face of the drum between two adjacent turns of the helix to impede progression of the products in the drum, and perforations or grids provided in the portion of the helix turn which is located upstream of the vane with respect to the direction of progression of the products in the drum, and above and upstream of the face of the vane, this invention being used more particularly in the food industry.

16 Claims, 7 Drawing Figures

DEVICE FOR PROCESSING A FLOW SOLID PRODUCTS BY MEANS OF A FLOW OF LIQUID, MORE PARTICULARLY FOR COOLING VEGETABLES

BACKGROUND OF THE INVENTION

The present invention relates to a device for processing a flow of solid products with a counter-current flow of liquid, so as to ensure a thermal, physical and/or chemical exchange between the two flows.

The present invention has more particularly for a subject matter a device for cooling hot vegetables by means of a counter-current flow of water, more particularly by ensuring an intermittent dipping, steeping or soaking of the vegetables.

There are already known, particularly from French Pat. No. 2 119 571 of Dec. 21st, 1971, a method and devices for processing a flow of solid products by means of a counter-current flow of liquid, comprising a drum rotating about its axis and divided into several sections by annular discs. The solid products are fed to the drum at one end thereof and displaced towards its other end by mechanical means, whereas the liquid is fed to the drum at its other end and displaced in the opposite direction by mechanical means or by gravity. The separation of the products from the liquid is ensured by a perforated surface provided in each section and through which the liquid falls by gravity. The devices using gravity for displacing the liquid suffer from a major drawback which lies in the fact that the drum must be inclined. Moreover, in the device comprising in each section a perforated surface for separating the solid products from the liquid by causing the liquid to fall by gravity through the perforations, there often occurs an accumulation of the materials on the vertical partition walls dividing the drum into sections, which involves a risk of obturation of the perforations. Moreover, the access to those surfaces is relatively difficult, which makes the cleaning of the device difficult.

SUMMARY OF THE INVENTION

The present invention has particularly as its purpose to remedy the above drawbacks by providing a device in which the solid products are displaced continuously, from one end of the drum to its other end, by mechanical means, whereas the liquid is displaced in the said drum by mechanical means step by step and in the opposite direction to the solid products, and is separated from the latter through a perforated wall under the action of a compression exerted by the mechanical product-advancing means.

To this end, the invention provides a device for processing a flow of solid products with a counter-current flow of liquid, so as to ensure a thermal, physical and/or chemical exchange between the two flows, for example for cooling vegetables by means of a counter-current flow of water. This device comprises a drum rotating about its longitudinal axis, an endless helix or screw arranged within the said drum and solid in rotation therewith, the edges of each turn of the said helix coming into contact with the internal face of the drum, thus defining sections, and means for feeding the drum with the solid products and the liquid at each end, respectively, of the said drum, characterized in that it comprises, in each of the said sections, at least one vane or blade element secured to the internal face of the drum between two adjacent turns of the helix to impede the progression of the products in the said drum, and means for allowing the liquid to pass from one section into the following upstream section, with respect to the direction of progression of the products in the drum, and retaining the products in the said section, the said means being formed in the helix turn located upstream of the said vane according to the direction of progression of the solid products in the drum, and in a portion of the said turn located immediately below and upstream of the face of the said vane with respect to the direction of rotation of the drum.

According to another feature of the invention, the said means for allowing the liquid to flow from one section to the following upstream section is constituted by perforations provided in the said portion of the said upstream turn.

Thus, when the water and the products are prevented from rotating by the vane, the latter causes a compression to be exerted on the liquid, thus compelling it to pass through the perforations of the turn located at the upstream side of the vane, since the turn located at the downstream side has no perforations in proximity to the said vane.

Advantageously, the said drum is a cylindrical drum with a substantially horizontal longitudinal axis.

According to still another feature of the invention, the said vane is a partition wall secured by one of its sides to the internal face of the drum and forming an angle between about 20° and about 60°, preferably equal to about 40°, with the diametral plane of the drum passing through the said line of contact between the side of the vane and the internal face of the drum.

Furthermore, the length of the said vane is between about 0.3 and about 0.5 times the diameter of the drum, and, preferably, is equal to about 0.4 times the said diameter.

According to still another feature of the invention, two said vanes following one another in the longitudinal direction of the drum are so secured as to be angularly shifted with respect to one another on the circumference of the said drum.

Advantageously, this shift angle is between about 90° and about 270° and defines the time of contact between the products and the liquid.

Furthermore, the said vanes are dihedral members whose upstream side, with respect to the direction of rotation of the drum, forms the vane proper, the downstream side forming the supporting side for the said vane.

Moreover, this downstream side offers the advantage that it prevents the products from passing under the vane.

According to still another feature of the invention, the said endless helix or screw is constituted by a band of material of a given width wound in the form of a helix.

The feeding of the liquid to the drum is discontinuous, whereas the feeding of the solid products may be discontinuous or continuous depending on whether the section located on the product feeding side is obturated by an element forming an obturating partition wall arranged between the two first turns of the helix, or whether an annular disc provided with perforations on at least a portion of its surface is secured to the drum end associated with the feeding of the solid products.

BRIEF DESCRIPTION OF THE DRAWINGS

Other features, details and advantages of the invention will appear more clearly in light of the following explanatory description of one form of embodiment of the device of the invention given solely by way of example with reference to the appended non-limitative diagrammatic drawings wherein.

DETAILED DESCRIPTION OF THE PREFERRED EMBODIMENTS

Figure 1:
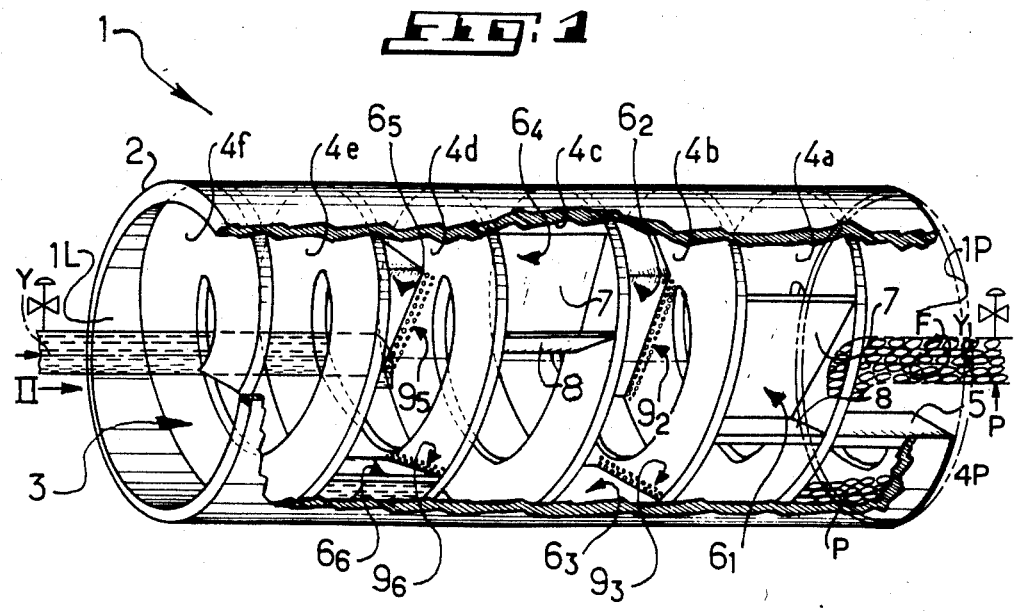
FIG. 1 is a perspective view of the device of the invention.

The device of the invention comprises essentially a drum 1 illustrated in FIGS. 1, and 3 to 6, means for rotating the drum 1 about its longitudinal axis Y—Y, means for feeding solid products P to the drum at one end 1P thereof, means for feeding a liquid L to the drum at its other end 1L, and means for collecting or gathering the processed solid products P flowing out through the end 1L of the drum, and the liquid L discharged at the end 1P. If necessary, the device may be provided with means for processing and recycling the liquid L into the drum.

For the sake of clarity, these various means, which are known per se, are not shown in the appended drawings.

Referring to FIGS. 1 and 3 to 6, there will be described more particularly the drum 1 of the device of the invention, which allows processing a flow of solid products P such as for example hot vegetables, with a flow of liquid L such as for example a flow of cold water.

Of course, the device of the invention may be used for treating any solid or liquid by means of a liquid or a solid, respectively. Thus, it may be used as a reactor for ensuring a chemical reaction between solid products and a liquid, or for purifying a solid product, for example through solubilization or entrainment of the impurities by a flow of liquid.

These examples therefore show that the device of the invention, which is particularly suitable for the cooling of vegetables, may be used for many other applications requiring an exchange of materials, calories, etc., between a solid product and a liquid.

In the illustrated and preferred form of embodiment of the invention, the drum 1 is a cylinder 2 open at both ends and mounted substantially horizontally on supporting means and the means for driving in rotation, already mentioned, so as to drive the drum 2 in rotation in the direction shown by arrow F, about its horizontal longitudinal axis Y—Y. The cylinder has an inner diameter D.

The internal space of the cylinder is divided into a certain number of sections by an endless helix or screw 3 the external edge of the turns of which is in contact with the internal face of the cylinder 2.

In the illustrated preferred form of embodiment of the invention, the endless helix or screw 3 is constituted by a band of material of a given width which is wound helically. Thus, the helix 3 has an axial passage defined by the internal edge of the turns 4.

In the form of embodiment of the invention illustrated, a partition wall 5 is secured between the end 4P of the helix 3 located at the end 1P of the drum 1 and the wall of the adjacent turn 4a to thus obturate the section defined by the turns 4a,4b and retain the solid product P fed to this section.

In a variant of embodiment of the device of the invention, the partition wall 5 may be removed and replaced by an annular disc secured on the end 1P of the drum 1, the said disc comprising on at least a portion of its surface perforations for discharging the liquid L from the drum 1.

According to the invention, there is mounted in each section at least one vane or blade element 6. Thus, in the example illustrated, the drum 1 is provided with six vanes $6_1$, $6_2$, $6_3$, $6_4$, $6_5$, $6_6$ secured in each of the six sections defined by the turns 4 of the helix 3, with the exception of the first section adjacent to the end 1P of the drum, i.e. the solid product feed sections. The obturating wall 5 is located downstream of the vane $6_1$ with respect to the direction of rotation F of the drum.

Said vanes are constituted, in the form of embodiment illustrated, by a dihedral member secured to the internal face of the drum 1 between two adjacent turns of the helix 3. The wall 7 located upstream, with respect to the direction F of rotation of the drum, of said dihedral member constitutes the vane proper and is secured to the internal face of the drum 1 by one of its edges. The downstream wall 8 of the dihedral member is merely a supporting wall for the other edge of the wall 7. Moreover, the wall 8 allows preventing the passage of the solid products or the liquid under the wall 7.

Figure 2:
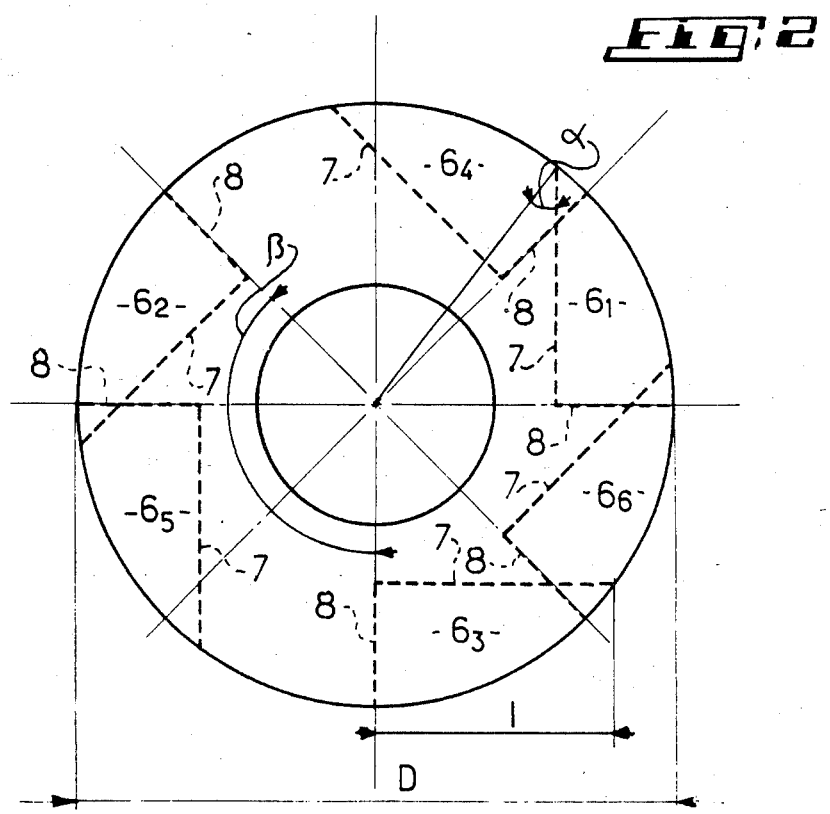
FIG. 2 is a projection on a plane of the device of the invention, in the direction of arrow II of FIG. 1.

As seen in FIG. 2, the vanes $6_1$, $6_2$, $6_3$, $6_4$, $6_5$, $6_6$ are angularly shifted from one another at the periphery of the cylinder 2, the angle of shift $\beta$ between two adjacent baffles being advantageously constant all along the drum. It is comprised between about 90° and about 270°. This angle allows defining the time of contact between the products and the liquid.

Furthermore, the useful length l of the vane, or in other words the length of the wall 7 of the dihedral member is comprised between about 0.3 and about 0.5 times the diameter D of the drum and preferably equal to about 0.4 times the diameter D.

On the other hand, the wall 7 of the vane 6 forms an angle $\alpha$ comprised between about 20° and about 60°, and preferably equal to about 40° with the diametral plane of the drum passing through the line of contact of the edge 7a of the wall 7 with the internal face of the cylinder 2.

According to the invention, the drum 1 is also provided with means for allowing the liquid L to pass from one section into the other in the opposite direction of progression to that of the solid P, as will be described later. These means are constituted by perforations 9 provided in the turns 4 of the helix 3. The said perforations are provided at the level of each vane 6 only in the turn located upstream of the associated vane, with respect to the direction of progression of the solid products P in the drum 1, denoted by the arrow P, for example in the turn 4a associated with the baffle $6_1$, whereas the turn 4b has no perforations at the level of the baffle $6_1$. These perforations are provided immediately above and upstream of the upper surface of the wall 7 of the baffle 6, with respect to the direction F of rotation of the drum.

The perforations may either consist of a plurality of holes machined in the helix 3 or be a grid portion of the helix 3.

Furthermore, in the form of embodiment illustrated, the angle of the dihedron constituting each baffle 6 is a right angle. However, any suitable angle may be selected and even the wall 8 may be dispensed with without departing from the scope of the invention.

There will now be described with reference to FIGS. 3 to 7 the operation of the device of the invention.

Figure 3:
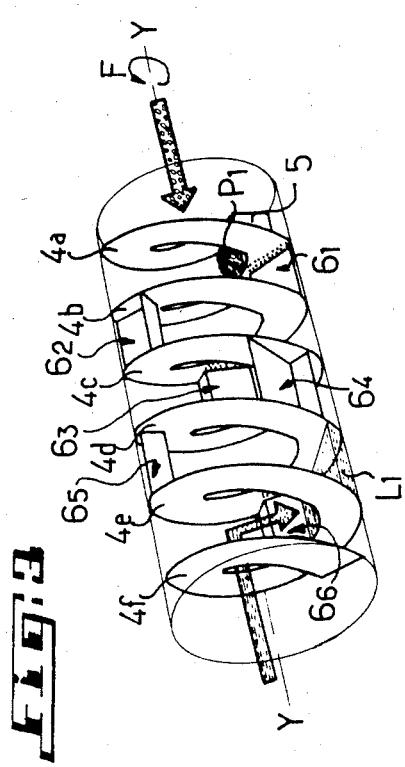
FIGS. 3 to 6 are diagrammatic drawings illustrating the progression of the liquid and the products in the device of the invention, depending on the rotation of the drum.

FIG. 3 illustrates the starting of the device of the invention. To this end, a first quantity or unit of the product $P_1$ is fed downstream of the wall 5 between the turns $4a,4b$ of the helix 3 and a first quantity or unit of liquid $L_1$ is fed between the turns $4e,4f$ immediately upstream of the baffle $6_6$, as shown by the arrows P and L, respectively.

Figure 4:
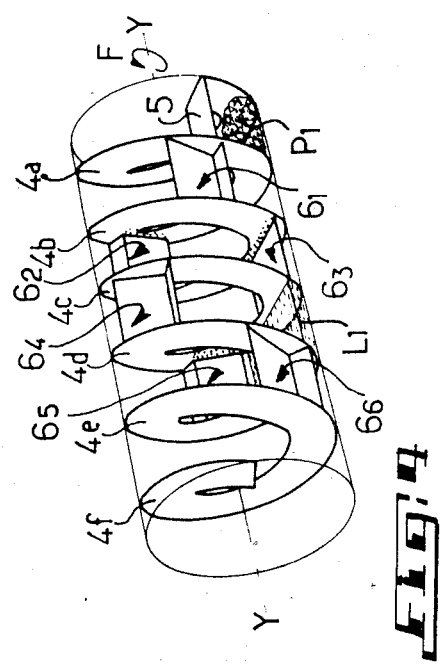

The drum is thereafter put into rotation in the direction of arrow F. FIG. 4 shows the position of the solid product unit $P_1$ and of the liquid unit $L_1$ in the drum after a 90° rotation of the drum. The solid product unit $P_1$ has progressed in the drum regularly according to the pitch of turns of the helix 3. On the contrary, the liquid unit $L_1$ has been compressed by the vane $6_6$ and compelled to pass through the perforation $9_6$ to thus pass into the following section defined by the turns $4e$ and $4d$ of the helix 3.

Figure 7:
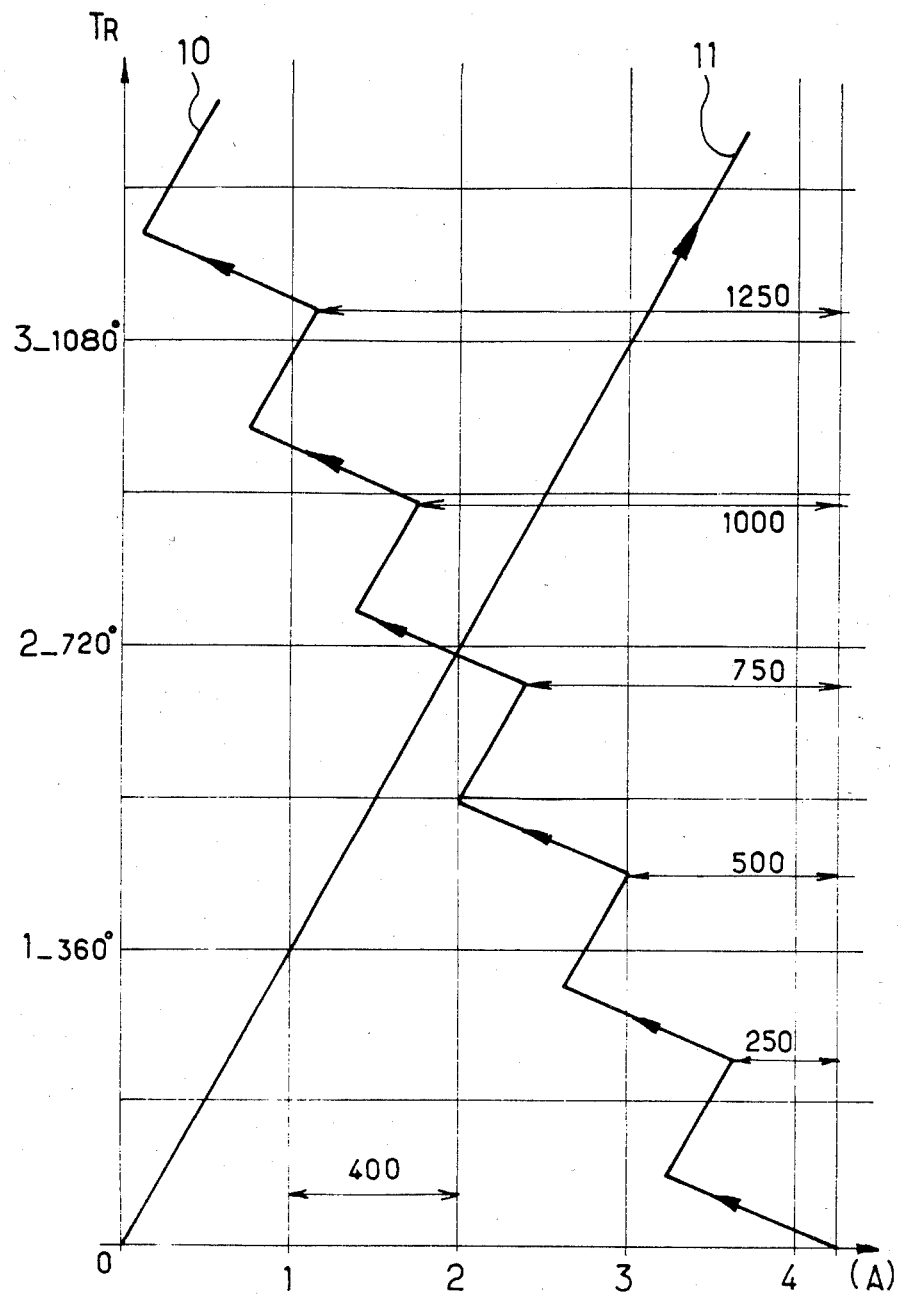
FIG. 7 is a diagram illustrating the progression A of the product and the liquid in the longitudinal direction of the drum as a function of the number ($T_R$) of rotation of the latter.

Therefore, in the drum 1, the helix 3 causes the products P to progress regularly and linearly as illustrated by the curve 11 of FIG. 7, thus moving from the end 1P of the drum towards the end 1L, whereas each unit of liquid L achieves in the drum a step-by-step progression corresponding to the angular shift of the vanes 6 on the periphery of the drum. Thus, each vane 6 constitutes a compression vane co-operating with the adjacent turns to compel the liquid to pass through the perforations 9 and thus cause it to progress from the end 1L of the drum 1 towards the end 1P, as illustrated by the curve 10 of the diagram of FIG. 7.

Figure 5:
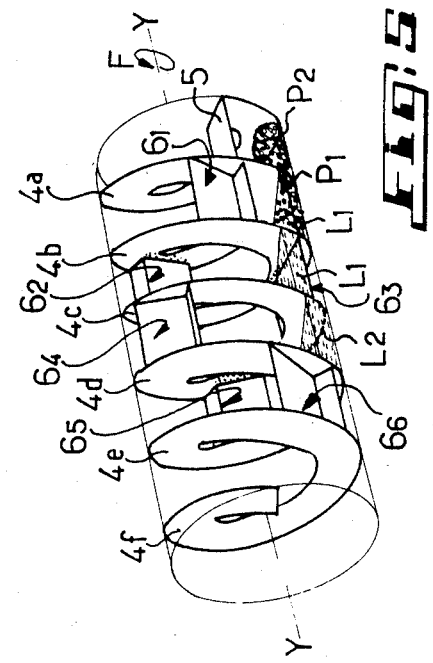

Another unit of liquid $L_2$ and another unit of solid products $P_2$ will be fed in every rotation of the drum, as illustrated in FIG. 5.

However, in the form of embodiment of the invention comprising an annular disc secured to the end 1P of the drum 1, it is possible to feed continuously the solid products P to the drum.

Figure 6:
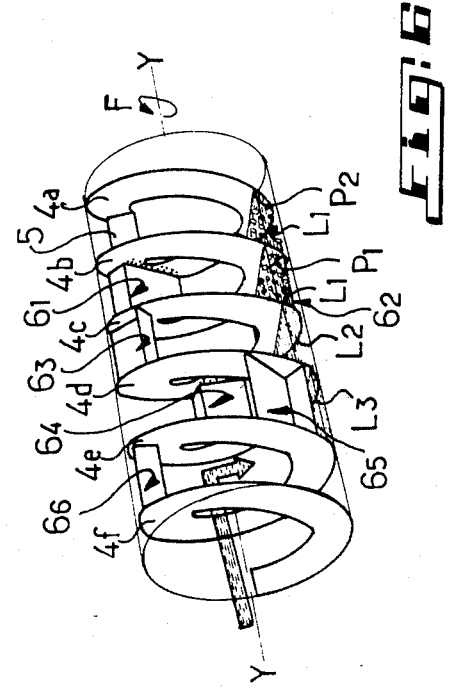

In FIGS. 5 and 6 is shown the position of two units of liquid $L_1$, $L_2$ and two units of solid products $P_1$, $P_2$, when the first unit of liquid $L_1$ comes into contact with the first unit of product $P_1$.

When the whole of the two units of solid products $P_1$ and of liquid $L_1$ reach the vane 5, as illustrated in FIG. 6, the compression exerted by the vane on the liquid and the solid impedes, on the one hand, the progression of the solid, thus increasing the time of contact of the liquid with the solid, and causes on the other hand the unit of liquid $L_1$ to pass through the perforations $9_2$ and to thus pass into the next section and come into contact with the solid product unit $P_2$. The solid product unit $P_1$ continues its progression in the drum 1 by overturning on the edge of the dihedron of the vane $6_2$ and comes into contact with the following unit of liquid $L_2$ as soon as the vane $6_3$ has compelled the unit of liquid $L_2$ to pass through the perforations $9_3$ of the spiral $4c$. Therefore, in the example illustrated, each unit of solid product is in contact with a unit of liquid during a rotation of about 315° per revolution of the drum. Of course, this time of contact depends on the shift angle between two adjacent vanes.

The invention therefore provides a device allowing a solid product such as a vegetable to be processed with a counter-current flow of liquid such as water for cooling the vegetable. The liquid is compelled by the compression vanes to progress step-by-step in the drum 1, whereas the solid products are displaced in the said drum continuously by the helix 3. The surface of the separating means 9 is cleaned automatically by the frictional action of the solid products which entrains the adhering products, and by the passage of the liquid under pressure.

What is claimed is:

1. A device for processing the flow of solid products with a counter-current flow of liquid, so as to ensure at least one of thermal, physical or chemical exchange between the two flows, for example for cooling vegetables, comprising a drum rotating about its longitudinal axis, an endless helix or screw arranged within the drum and linked in rotation therewith, the edge of each turn of the helix coming into contact with the internal surface of the drum to thus define sections, means for feeding the products at one end of the drum and means for feeding the liquid at the other end thereof, so that the products and liquid are successively fed to each of the sections, at least one solid product contacting vane or blade element being secured to the internal face of the drum between two adjacent turns of the helix so as to come into contact with the solid products and to impede the progression of the products in the drum, and liquid passing means for allowing the liquid to pass from one section to the next upstream section with respect to the direction of progression of the solid products in the drum, and retaining the products in the section, said liquid passing means being formed in the portion of the turn of the helix located upstream of the vane, with respect to the direction of progression of the products in the drum, the portion of the liquid passing means being located immediately above and upstream of the face of the vane in the direction of rotation of the drum, thereby separating the liquid from the solid products under the action of a compression exerted by the vane or blade element.

2. The device of claim 1, wherein said portion of the liquid passing means for allowing the liquid to pass from one section to the next is constituted by perforations or grids provided in the portion of the turn.

3. The device of claim 1, wherein the drum is a cylindrical drum with a substantially horizontal longitudinal axis.

4. A device for processing the flow of solid products with a counter-current flow of liquid, so as to ensure at least one of thermal, physical or chemical exchange between the two flows, for example for cooling vegetables, comprising a drum rotating about its longitudinal axis, an endless helix or screw arranged within the drum and linked in rotation therewith, the edge of each turn of the helix coming into contact with the internal surface of the drum to thus define sections, means for feeding the products at one end of the drum and means for feeding the liquid at the other end thereof, so that the products and liquid are successively fed to each of the sections, at least one solid product contacting vane or blade element being secured to the internal face of the drum between two adjacent turns of the helix so as to come into contact with the solid products and to impede the progression of the products in the drum, and liquid passing means for allowing the liquid to pass from one section to the next upstream section with respect to the direction of progression of the solid products in the drum, and retaining the products in the section, said liquid passing means being formed in the portion of the turn of the helix located upstream of the vane, with respect of the direction of progression of the products in the drum, the portion of the liquid passing means being located immediately above and upstream of the face of the vane in the direction of rotation of the drum, the vane being a partition wall secured by one of its sides to the internal face of the cylinder of the drum and forming an angle $\alpha$ between about 20° and about 60° with the diametral plane of the drum passing through the line of contact between the side of the vane and the internal face of the cylinder of the drum, thereby separating the liquid from the solid products under the action of a compression exerted by the vane or blade element.

5. The device of claim 1, wherein the length of said vane is between about 0.3 and about 0.5 times the internal diameter of the cylinder.

6. The device of claim 1, wherein two vanes succeeding each other in the longitudinal direction of the drum are secured so as to be angularly shifted by a shift angle with respect to one another on the periphery of the drum.

7. The device according to claim 6, wherein the shift angle $\alpha$ between two successive vanes is between about 90° and about 270°.

8. A device for processing the flow of solid products with a counter-current flow of liquid, so as to ensure at least one of thermal, physical or chemical exchange between the two flows, for example for cooling vegetables, comprising a drum rotating about its longitudinal axis, an endless helix or screw arranged within the drum and linked in rotation therewith, the edge of each turn of the helix coming into contact with the internal surface of the drum to thus define sections, means for feeding the products at one end of the drum and means for feeding the liquid at the other end thereof, so that the products and liquid are successively fed to each of the sections, at least one solid product contacting vane or blade element being secured to the internal face of the drum between two adjacent turns of the helix so as to come into contact with the solid products and to impede the progression of the products in the drum, and liquid passing means for allowing the liquid to pass from one section to the next upstream section with respect to the direction of progression of the solid products in the drum, and retaining the products in the section, said liquid passing means being formed in the portion of the turn of the helix located upstream of the vane, with respect to the direction of progression of the products in the drum, the portion of the liquid passing means being located immediately above and upstream of the face of the vane in the direction of rotation of the drum, the vanes being constituted by dihedral members, a side thereof located upstream with respect to the direction of rotation of the drum constituting the vane proper, and a downstream side thereof constituting a supporting side for the upstream side and impeding passage of the solid products below the vane or blade element, thereby separating the liquid from the solid products under the action of a compression exerted by the vane or blade element.

9. The device of claim 1, wherein the endless helix or screw is constituted by a band of material of a given width wound in the form of a helix.

10. The device of claim 1, wherein between the helix end, located on the drum side where the solid products are fed to the said drum, and the adjacent turn, is arranged an element constituting an obturating wall.

11. The device of claim 1, wherein the product feed and the liquid feed are discontinuous.

12. The device of claim 1, wherein an annular disc perforated on at least a portion of its surface is secured to the drum end corresponding to the feeding of the solid products.

13. The device of claim 1, wherein the feeding of said solid products is continuous, whereas the feeding of said liquid is discontinuous.

14. The device of claim 4, wherein the angle $\alpha$ is about 40°.

15. The device of claim 5, wherein the length of the vane is about 0.4 times the internal diameter of the cylinder.

16. The device of claim 10, wherein the obturating wall is downstream of the first vane with respect to the rotation direction.

* * * * *